United States Patent
Cho et al.

(10) Patent No.: US 6,877,861 B2
(45) Date of Patent: Apr. 12, 2005

(54) PROJECTION SYSTEM AND METHOD OF FORMING COLOR IMAGE

(75) Inventors: Kun-ho Cho, Suwon-si (KR); Dae-sik Kim, Suwon-si (KR); Sung-ha Kim, Seoul (KR); Hee-joong Lee, Anyang-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 10/811,490

(22) Filed: Mar. 29, 2004

(65) Prior Publication Data

US 2004/0246445 A1 Dec. 9, 2004

Related U.S. Application Data

(60) Provisional application No. 60/457,917, filed on Mar. 28, 2003.

(30) Foreign Application Priority Data

Jun. 16, 2003 (KR) ................................ 10-2003-0038678

(51) Int. Cl.[7] ............................................... G03B 21/14
(52) U.S. Cl. ............................ 353/31; 348/743; 353/97
(58) Field of Search ............................. 353/20, 31, 34, 353/37, 84, 97; 348/742, 743, 771; 349/5, 7, 8, 9

(56) References Cited

U.S. PATENT DOCUMENTS

| 6,591,022 B2 | * | 7/2003 | Dewald .................... 382/274 |
| 6,619,802 B2 | * | 9/2003 | Janssen et al. ............... 353/31 |
| 6,642,969 B2 | * | 11/2003 | Tew .......................... 348/743 |
| 6,771,325 B1 | * | 8/2004 | Dewald et al. ............. 348/743 |
| 6,824,270 B2 | * | 11/2004 | Kim et al. .................... 353/31 |
| 2002/0191154 A1 | | 12/2002 | Shahzad et al. |

FOREIGN PATENT DOCUMENTS

| JP | 11-281930 A | 10/1999 |
| KR | 1999-00234 A | 1/1999 |

* cited by examiner

*Primary Examiner*—William C. Dowling
(74) *Attorney, Agent, or Firm*—Sughrue Mion, PLLC

(57) ABSTRACT

A projection system and method are provided. The projection system includes a light source, at least one filter having a slit, a scrolling unit, a color separator, and a light valve. The slit in the at least one filter controls a divergence angle of light emitted from the light source. The scrolling unit scrolls an incident beam. The color separator has a plurality of dichroic filters which separate an incident beam emitted from the light source according to color. The light valve receives a plurality of color beams from the color separator and transmitted by the scrolling unit on corresponding color areas and forms a plurality of color bars by scrolling the color beams. A black bar is formed between adjacent color bars by controlling a distance between adjacent dichroic filters or by controlling the width of the slit in the at least one filter.

30 Claims, 13 Drawing Sheets

PROJECTION SYSTEM AND METHOD OF FORMING COLOR IMAGE

This application claims the priority of Korean Patent Application No. 2003-38678, filed on Jun. 16, 2003, in the Korean Intellectual Property Office, and the benefit of U.S. Patent Provisional Application No. 60/457,917, filed on Mar. 28, 2003, in the U.S. Patent and Trademark Office, the disclosures of which are incorporated herein in their entirety by reference.

BACKGROUND OF THE INVENTION

1. Field of the Invention

The present invention relates to a method of forming a color image using a color scrolling technique and a projection system adopting this method, and more particularly, to a projection system and a method of forming a color image, in which a black bar is formed between color bars formed on a light valve, and a rising time and a falling time required to change image signals for the color bars are secured by controlling the width of the black bar.

2. Description of the Related Art

Generally, projection systems are classified into either 3-panel projection systems or single-panel projection systems, according to the number of light valves used. The light valves control the on/off operation of light on a pixel-by-pixel basis, thereby forming a picture. A high-output lamp is used as a light source. Single-panel projection systems can have smaller optical systems than can three-panel projection systems. However, these single-panel projection systems provide an optical efficiency of only ⅓ of that of three-panel projection systems because red (R), green (G), and blue (B) colors into which white light is separated are used sequentially. Hence, attempts have been made to increase the optical efficiency of single-panel projection systems.

Generally, in a single-panel projection system, light radiated from a white light source is separated into R, G, and B color beams using color filters, and the three color beams are sequentially transmitted to a light valve. The light valve operates and creates images according to the sequence of color beams received. As described above, a single-panel projection system processes color beams sequentially, therefore, the light efficiency is reduced to ⅓ of the light efficiency of a three-panel projection system. According to one color scrolling method designed to increase the optical efficiency of a single-panel projection system, white light is separated into R, G, and B color beams, and the three color beams are sent simultaneously to different locations on a light valve. Since an image cannot be produced until all of the R, G, and B color beams for each pixel reach the light valve, the color beams are moved at a constant speed using a color scrolling method.

In a single-panel scrolling projection system, as shown in FIG. 1, white light emitted from a light source 100 passes through first and second lens arrays 102 and 104 and a polarization conversion system (PCS) 105 and is separated into R, G, and B color beams by first through fourth dichroic filters 109, 112, 139, and 122. To be more specific, the red beam R and the blue beam B, for example, are transmitted by the first dichroic filter 109 and advance along a first light path L1, while the green beam G is reflected by the first dichroic filter 109 and travels along a second light path L2. The red beam R and the blue beam B on the first light path L1 are separated by the second dichroic filter 112. The second dichroic filter 112 transmits the red beam R along the first light path L1 and reflects the blue beam B along a third light path L3.

First through third prisms 114, 135 and 142 are disposed on the first through third light paths L1, L2, and L3, respectively. The light emitted from the light source 100 is separated into the R, G, and B beams, and they are then scrolled while passing through corresponding first through third prisms 114, 135, and 142. The first through third prisms 114, 135, and 142 rotate at a uniform speed such that R, G, and B color bars are scrolled. The G and B beams that travel along the second and third light paths L2 and L3, respectively, are transmitted and reflected by the third dichroic filter 139, respectively, and thereby combined. Finally, the R, G, and B beams are combined by the fourth dichroic filter 122. The combined beam is transmitted to a light valve 130 via a polarization beam splitter (PBS) 127. The light valve 130 forms a picture.

A condensing lens 107 is disposed next to the PCS 105, and light path correction lenses 110, 117, 131, 137, and 145 are disposed along the first through third light paths L1, L2, and L3. Condensing lenses 120 and 140 are disposed between the second and fourth dichroic filters 112 and 122 and between the third and fourth dichroic filters 139 and 122, respectively. A focusing lens 124 and a polarizer 125 are disposed on the light path between the fourth dichroic filter 122 and the PBS 127. Light path changers, for example, mirrors 118 and 133, are disposed on the first and second light paths L1 and L2, respectively.

The periodic scrolling of the R, G, and B color bars due to rotation of the first through third prisms 114, 135, and 142 is illustrated in FIG. 2. Scrolling represents the movement of color bars formed on the surface of the light valve 130 when the first, second, and third prisms 114, 135, and 142 corresponding to R, G, and B colors are rotated synchronously. As described above, as R, G, and B color bars circulate during one cycle, one frame of a color image is formed.

A color image, obtained by turning on or off the individual pixels of the light valve 130 according to an image signal, is magnified by a projection lens (not shown). Then, the magnified image is made incident on a screen.

First, second, and third slits 113, 134, and 143 are disposed in front of the first, second, and third prisms 114, 135, and 142, respectively, and control the divergence angle of incident light.

Since the conventional projection system uses different light paths for each color as described above, a light path correction lenses must be included for each color. Additionally, components are also required for recombining separated color beams Hence, the optical system becomes bulky, and the manufacture and assembly thereof is complicated, thus degrading the yield. In addition, three motors (not shown) for rotating the first, second, and third prisms 114, 135, and 142 generate a lot of noise during operation, and a projection system utilizing three motors is manufactured at a greater cost than a color wheel type projection system which utilizes a single motor.

In order to produce a color picture using a scrolling technique, color bars as shown in FIG. 2 must be moved at a constant speed. Since the conventional projection system must synchronize the light valve 130 with the three prisms 114, 135, and 142 in order to achieve scrolling, controlling the synchronization is not easy. Further, because the first, second, and third prisms 114, 135, and 142 are circularly rotated, the color scrolling speed is irregular, consequently deteriorating the quality of the resultant image.

The widths of the three color bars vary according to the width of each beam traveling along the first, second, and third light paths L1, L2, and L3. If the widths of the beams traveling along the first, second, and third light paths L1, L2, and L3 decrease, the R, G, and B color bars are narrowed such that black bars K are formed between adjacent color bars as illustrated in FIG. 3A. On the other hand, if the widths of the beams traveling along the first, second, and third light paths L1, L2, and L3 increase, the R, G, and B color bars are enlarged such that overlapping portions P are formed between adjacent color bars as illustrated in FIG. 3B.

When a liquid crystal display (LCD) is used as the light valve 130, the black bars K must be formed because consecutively processing image signals for color bars is difficult. More specifically, when color bars are consecutively scrolled on the LCD, image signals change every time the color bars are scrolled. However, consecutively processing the changing image signals is difficult. FIG. 3C illustrates R, G, and B color bars formed on the light valve 130 and the on-off states of the light valve 130 according to input image signals corresponding to the R, G, and B color bars. The time required to turn on image signals corresponding to the R, G, and B color bars is referred to as a rising time, and a rising area is indicated by S. The time required to turn off the image signals corresponding to the R, G, and B color bars is referred to as a falling time, and a falling area is indicated by T. The rising time and the falling time are required to turn on and off a group of image signals which change every time the R, G, and B color bars are scrolled. To allow for these rising and falling periods of time, black bars K must be formed between adjacent color bars.

As described above, systems which form a color image using a color scrolling technique form black bars by controlling the widths of the color bars.

SUMMARY OF THE INVENTION

The present invention provides a method of forming a color image, in which a black bar is formed between adjacent color bars formed on a light valve, and a rising time and a falling time, required to change image signals for the color bars, are secured by controlling the width of the black bar.

The present invention also provides a projection system which forms a black bar between color bars formed on a light valve so that a color image can be smoothly formed.

According to an aspect of the present invention, there is provided a method of forming a color image, in which a rising time and a falling time, required to change image signals for a plurality of color bars formed on a light valve, are secured. This method includes: installing at least one filter having a slit; scrolling incident light by converting a rotation of a scrolling unit into a rectilinear motion of an area of lens cells of the scrolling unit through which the incident light passes; separating a beam emitted from a light source according to color using a color separator which comprises a plurality of dichroic filters, each filter reflecting one color of light and transmitting all other colors; forming a plurality of color bars by making the resultant plurality of color beams incident on corresponding color areas of the light valve; and forming a black bar between adjacent color bars by controlling a distance between adjacent dichroic filters or by controlling a width of the slit.

The distance between adjacent color bars may be greater than a mean of the widths of the adjacent color bars.

When first, second, and third dichroic filters are utilized and are disposed parallel to one another, the resultant first, second and third color bars having widths of $g_1$, $g_2$, and $g_3$, are formed, and the distances between the first and second dichroic filters and between the second and third dichroic filters are a and b, respectively. A proportional constant is represented by $\alpha$. The first, second and third dichroic filters are disposed to satisfy the following conditional expression so that black bars are formed between the first and second color bars and between the second and third color bars:

$$a > \frac{(g_1 + g_2)}{\alpha 2\sqrt{2}}$$

$$b > \frac{(g_2 + g_3)}{\alpha 2\sqrt{2}}$$

The at least one lens cell of the scrolling unit is spirally disposed.

When the at least one filter includes a spatial filter having a slit with a width w, a focal distance of the spatial filter is $f_1$, a focal distance of the scrolling unit is $f_2$, $\alpha$ is a proportional constant, and the widths of the first, second, and third color bars are equal, the spatial filter and the first, second, and third dichroic filters are disposed to satisfy the following conditional expression:

$$a > \frac{g}{\alpha\sqrt{2}} = \frac{wf_2}{\alpha\sqrt{2}\,f_1}$$

$$b > \frac{g}{\alpha\sqrt{2}} = \frac{wf_2}{\alpha\sqrt{2}\,f_1}$$

When the at least one filter includes a trim filter, with a slit width $t_1$ and a focal distance, $f_1$ equal to that of the spatial filter, and a focal distance of the scrolling unit $f_2$, the widths of the first and second color bars, $g_1$ and $g_2$ respectively, are controlled by the spatial filter and the width of the third color bar, $g_3$, is controlled by the trim filter according to the following equation:

$$g_1 = g_2 = w\frac{f_2}{f_1}$$

$$g_3 = t_1\frac{f_2}{f_1}$$

When the at least one filter includes first and second trim filters, with slit widths $t_1$ and $t_2$ and focal distances, $f_1$, equal to that of the spatial filter, and a focal distance of the scrolling unit is $f_2$, then the width of the first color bar, $g_1$ is controlled by the spatial filter and the widths of the second and third color bars, $g_2$ and $g_3$ respectively, are controlled by the first and second trim filters according to the following equation:

$$g_1 = w\frac{f_2}{f_1}$$

$$g_2 = t_1\frac{f_2}{f_1}$$

$$g_3 = t_2\frac{f_2}{f_1}$$

When the at least one filter includes first, second, and third trim filters, with slit widths $t_1$, $t_2$, and $t_3$, respectively, and, focal distances of the $f_1$, and a focal distance of the scrolling unit is $f_2$, then the widths of the first, second, and third color bars are controlled by the first, second, and third trim filters, respectively, according to the following equation:

$$g_1 = t_1 \frac{f_2}{f_1}$$

$$g_2 = t_2 \frac{f_2}{f_1}$$

$$g_3 = t_3 \frac{f_2}{f_1}$$

According to another aspect of the present invention, there is provided a projection system including: a light source; at least one filter having a slit which controls a divergence angle of light emitted from the light source; a scrolling unit comprising at least one lens cell, which converts a rotation of the scrolling unit into a rectilinear motion of an area of the lens cell through which light passes so that the incident beam is scrolled; a color separator, comprising a plurality of dichroic filters, which separates an incident beam emitted from the light source according to color; and a light valve which receives the resultant plurality of color beams on corresponding color areas and forms a plurality of color bars by scrolling the color beams. Each dichroic filter reflects one color of light and transmits all other colors. A black bar is formed between adjacent color bars by controlling a distance between adjacent dichroic filters or by controlling a width of the slit.

First and second fly-eye lens arrays may be disposed between the color separator and the light valve.

A first cylindrical lens is disposed in front of the scrolling unit and reduces the width of light incident on the scrolling unit, and the light transmitted by the scrolling unit is restored to its original width by the second cylindrical lens.

A relay lens is disposed between the second fly-eye lens and the light valve.

A polarization conversion system is disposed on a light path between the color separator and the light valve and converts light emitted from the light source into light with a single polarization.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
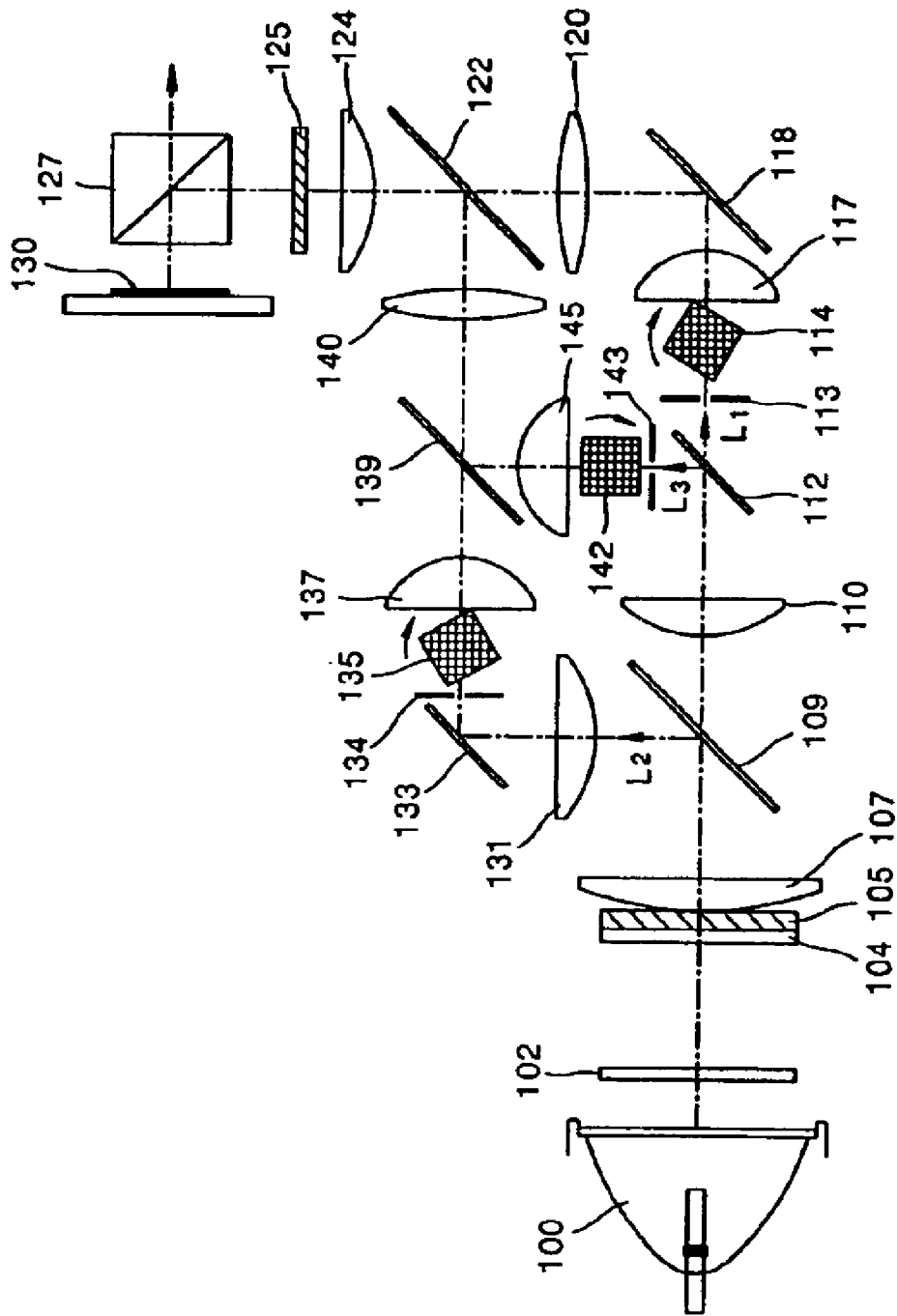
FIG. 1 is a schematic diagram of a conventional projection system.
Figure 2:
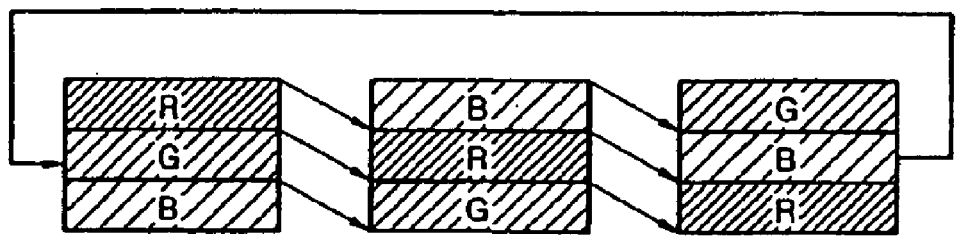
FIG. 2 is an illustration of color scrolling of R, G, and B color bars in a projection system.
Figure 3A:
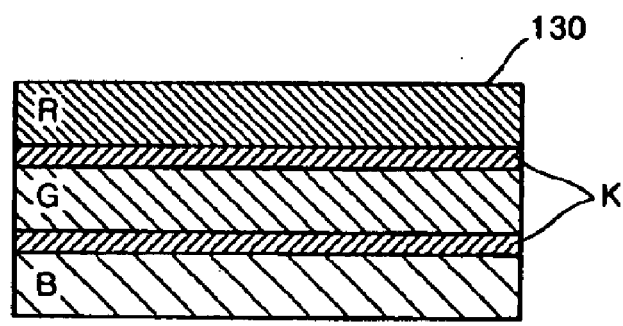
FIGS. 3A and 3B show color bars formed on a light valve used in a projection system to form a color image using a scrolling technique.
Figure 3B:
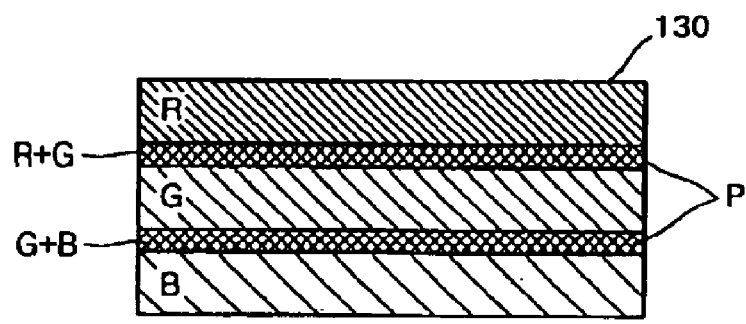
Figure 3C:
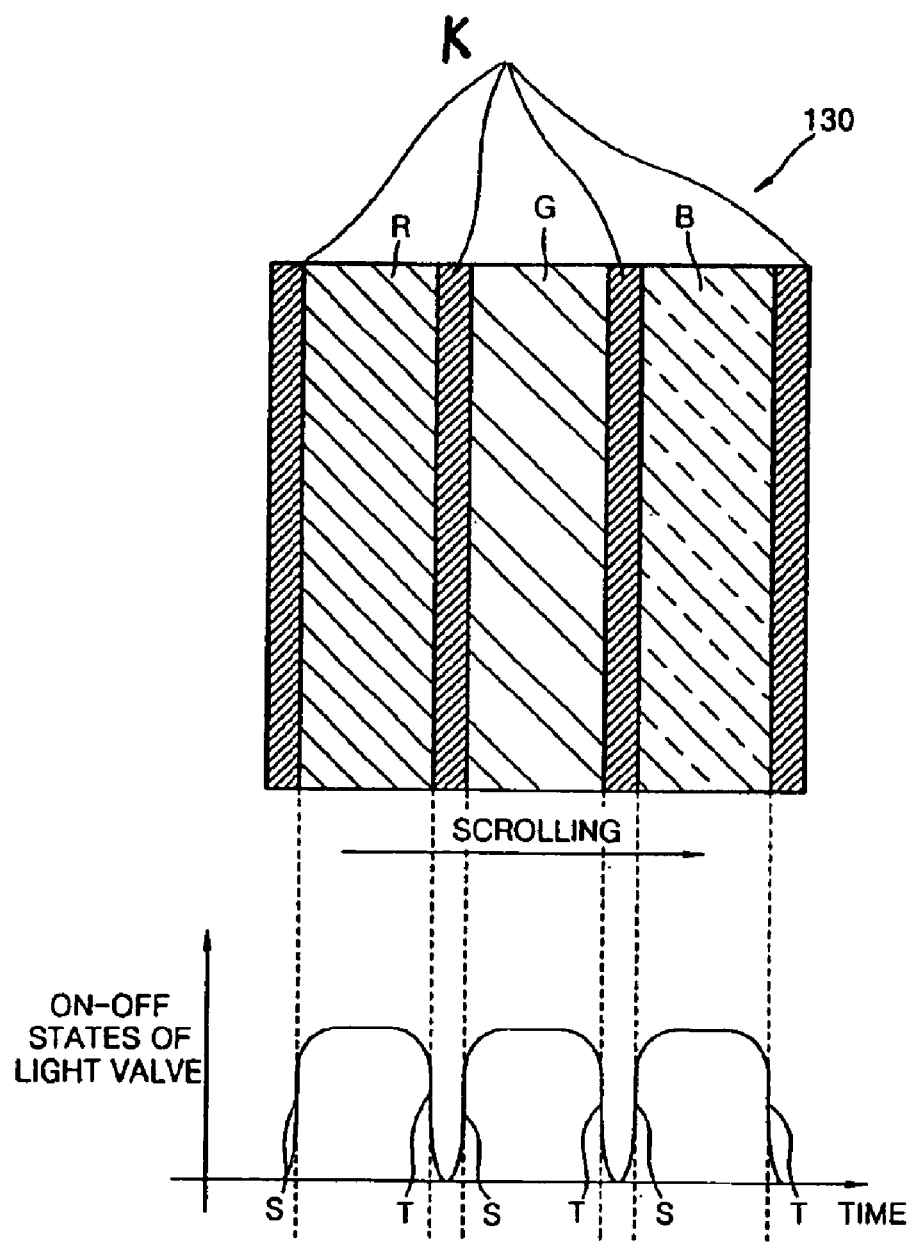
FIG. 3C illustrates color bars formed on a light valve and the on-off states of the light valve according to input image signals corresponding to the color bars.
Figure 4:
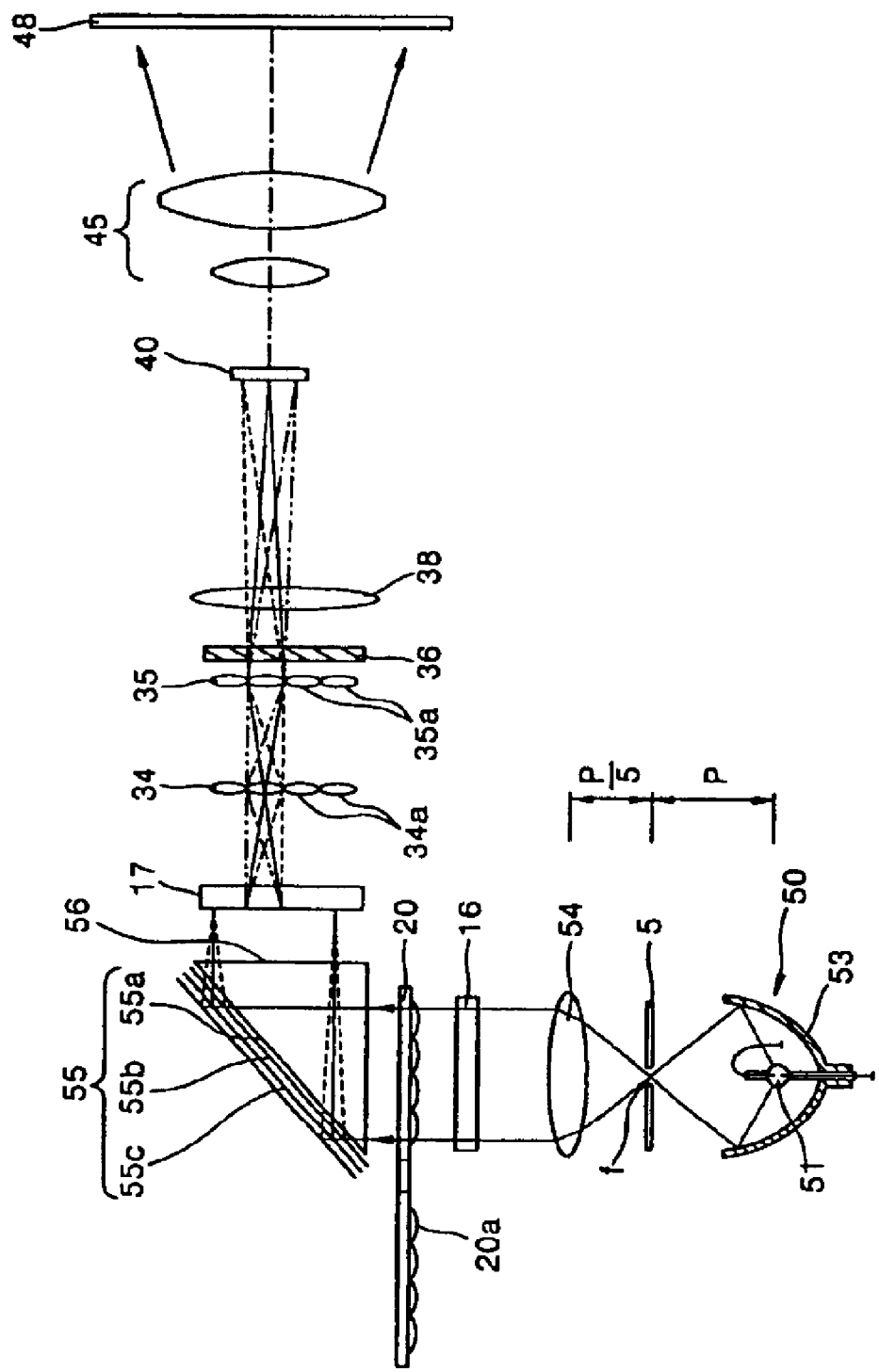
FIG. 4 is a schematic diagram of a projection system according to an embodiment of the present invention.

Referring to FIG. 4, a projection system according to an exemplary embodiment of the present invention includes a light source 50, at least one filter, a scrolling unit 20, a color separator 55, and a light valve 40. The at least one filter, for example space filter 5, is installed at a focal plane of light emitted from the light source 50 and has a slit for controlling the divergence angle of incident light. The scrolling unit 20 is designed so that it scrolls the incident light and transmits rays, which are incident on the color separator 55 at different angles. The color separator 55 separates light transmitted by the scrolling unit 20 according to color. The light valve 40 processes color beams produced by the color separator 55 according to input image signals and forms a picture.

The picture formed by the light valve 40 is magnified by a projection lens unit 45, and the magnified picture is projected onto a screen 48.

The light source 50 includes a lamp 51, for generating light, and a reflection mirror 53, for reflecting light emitted from the lamp 51 and for guiding the path of the reflected light. The reflection mirror 53 is an elliptical mirror whose first focal point is the position of the lamp 51 and whose second focal point is a point (f) where light is focused. Alternatively, the reflection mirror 53 may be a parabolic mirror which uses the lamp 51 as a focal point and which collimates light beams emitted from the lamp 51. If a parabolic mirror is used as the reflection mirror 53, a lens for focusing light is also be included.

The at least one filter includes a space filter 5 and/or one or more trim filters. The at least one filter is preferably, but not necessarily, disposed at the focal point (f) of the reflection mirror 53.

A collimating lens 54 for collimating incident light is installed between the light source 50 and the color separator 55. P denotes the distance between the light source 50 and the focal point (f) where light emitted from the light source 50 is focused. The collimating lens 14 is preferably, but not necessarily, installed at a distance of P/S from the focal point (f). By installing a projection system in this way, the structure of an optical system can be made more compact.

Figure 5A:
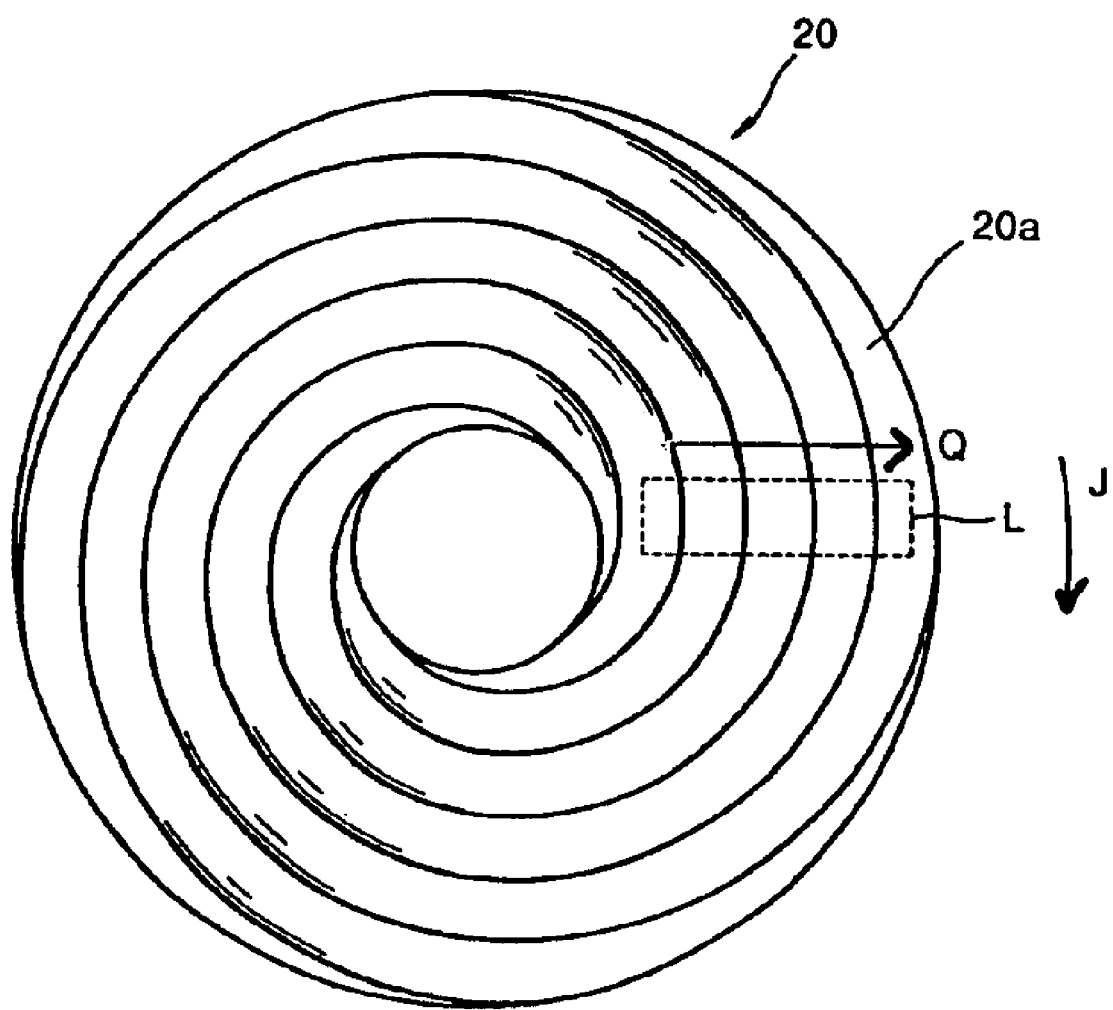
FIG. 5A is a front view of the scrolling unit of FIG. 4.

Referring to FIG. 5A, the scrolling unit 20 is rotatable and has an incidence surface and an emission surface. Preferably, but not necessarily, an arrangement of at least one lens cell 20a is disposed on the scrolling unit 20 so that the rotation of the scrolling unit 20 is converted into a rectilinear motion of an area of the scrolling unit 20 through which light passes. For example, the at least one lens cell 20a is spirally arranged on the scrolling unit 20. Each of the at least one lens cell 20a transmits incident light so that the rays in the incident light travel at different angles. The lens cell 20a may be a cylindrical lens.

Figure 5B:
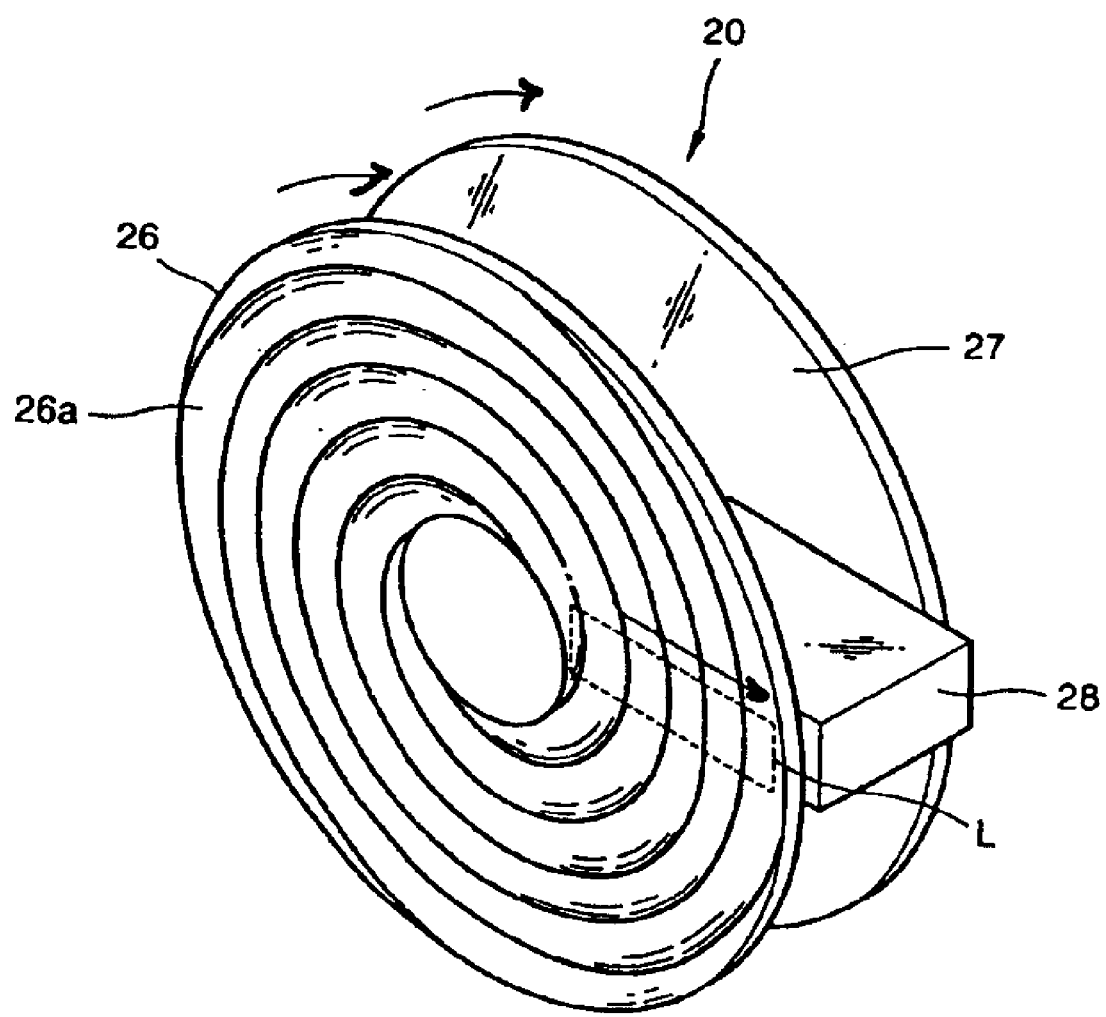
FIG. 5B is a perspective view of an alternate scrolling unit that can be used in the projection system of FIG. 4.

As shown in FIG. 5A, a rotation of the scrolling unit 20, in the direction indicated by arrow J, is converted into a rectilinear motion, in the direction indicated by arrow Q, of an area of the scrolling unit 20 through which incident light (L) passes, whereby scrolling is achieved. The scrolling unit 20 of FIG. 5A is a single spiral lens disk. However, the scrolling unit 20 may include first and second spiral lens disks 26 and 27, disposed a predetermined distance from each other, as illustrated in FIG. 5B. In this case, a glass rod or a guide light plate 28 is further interposed between the first and second spiral lens disks 26 and 27. The glass rod 28 controls the divergence angle of light transmitted by the first spiral lens disk 26.

Referring back to FIG. 4, the color separator 55 includes a plurality of dichroic filters, for example, first, second, and third dichroic filters 55a, 55b, and 55c, which transmit or reflect incident light according to color. The first, second, and third dichroic filters 55a, 55b, and 55c are disposed parallel to one another. However, the first, second, and third dichroic filters 55a, 55b, and 55c may be disposed aslant at different angles with respect to each other. Rays of the light beam incident on the scrolling unit 20 are transmitted at different angles according to the different locations on each of the cylindrical lens cells 20a on which the rays are incident. The rays are reflected by the first, second, or third dichroic filters 55a, 55b, or 55c such that the light beam is separated according to color. Also, a prism 56 is further included between the scrolling unit 20 and the color separator 55 such that incident light is transferred to the color separator 55 without a change in the path of the light.

A first cylindrical lens 16 is disposed in front of the scrolling unit 20, and a second cylindrical lens 17, first and second fly-eye lens arrays 34 and 35, and a relay lens 38 are sequentially arranged between the color separator 55 and the light valve 40. The first and second fly-eye lens arrays 34 and 35 are formed by two-dimensionally arranging lens cells 34a and 35a, respectively.

The first cylindrical lens 16 reduces the width of a light beam incident on the scrolling unit 20, and the beam then transmitted by the scrolling unit 20 is restored to its original width by the second cylindrical lens 17. The second cylindrical lens 17 may be installed between the first and second fly-eye lens arrays 34 and 35. A polarization conversion system 36 for converting incident light into light with a single polarization is disposed between the second fly-eye lens array 35 and the relay lens 38.

In the operation of the projection system of FIG. 4 having the above-described configuration, first, white light emitted from the light source 50 is incident on the scrolling unit 20 via the spatial filter 5 and the collimating lens 54. The width of the light incident on the scrolling unit 20 is reduced by the first cylindrical lens 16.

Figure 6A:
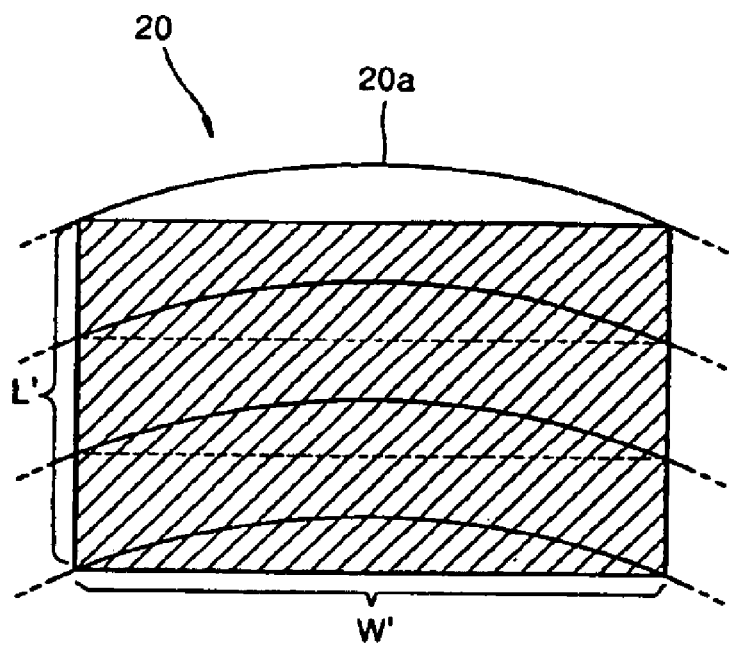
FIG. 6A shows the shape of a beam on the scrolling unit of FIG. 4 when no cylindrical lenses are used in the projection system of FIG. 4.
Figure 6B:
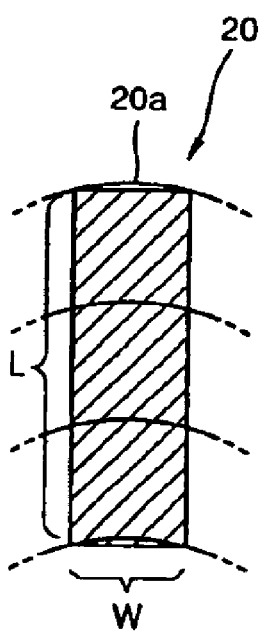
FIG. 6B shows the shape of a beam on the scrolling unit of FIG. 4 when a first cylindrical lens is used in the projection system of FIG. 4.

FIG. 6A illustrates a beam L' that is emitted from the light source 50 and incident on the scrolling unit 20 without passing through the first cylindrical lens 16. Beam L' has a width W'. FIG. 6B illustrates a beam L that has a width W reduced by the first cylindrical lens 16 and which is then incident on the scrolling unit 20. When a beam passing through the scrolling unit 20 is relatively wide, that is, in the case of the beam L', the curved shape of the array of spirally arranged lens cells 20a does not match with that of the beam L', and thus there is light loss over an unmatched area for each color. To minimize the light loss, preferably, but not necessarily, the first cylinder lens 16 is included to produce the beam L with a reduced width W so that the shape of the beam L aligns more closely with that of the array of spirally arranged lens cells 20a as illustrated in FIG. 6B.

Light rays incident on the scrolling unit 20 are diffracted at different angles according to the locations of each of the lens cells 20a on which the rays are incident. The diffracted rays are therefore incident on the color separator 55 at different angles. First, second, and third color beams produced by the first, second, and third dichroic filters 55a, 55b, and 55c of the color separator 55 are incident on the second cylindrical lens 17, which restores the transmitted light to its original width. Consequently, the width of the light transmitted by the second cylindrical lens 17 corresponds to the width of the light valve 40.

Figure 8:
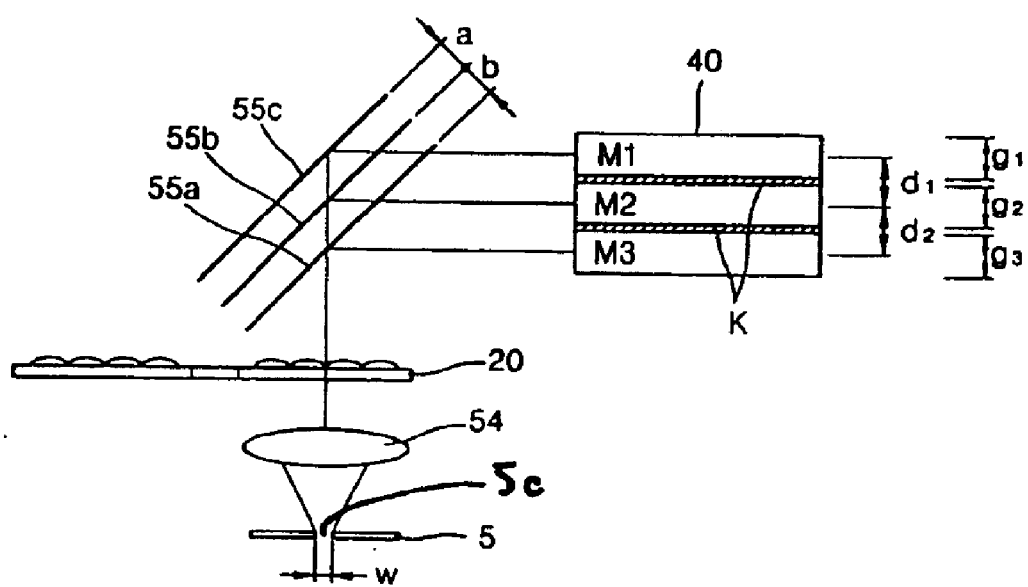
FIG. 8 illustrates a method of forming a color image, according to an embodiment of the present invention.

The first, second, and third color beams transmitted by the second cylindrical lens 17 are incident on the first fly-eye lens array 34 so that color lines are formed on each of the lens cells 34a. The first, second, and third color beams are transmitted by the second fly-eye lens array 35 and the relay lens 38 and are incident on corresponding color areas of the light valve 40 to form first, second, and third color bars M1, M2, and M3, as illustrated in FIG. 8.

The first, second, and third color bars M1, M2, and M3 are periodically scrolled due to the rotation of the scrolling unit 20, thereby forming a color image.

Figure 7A:
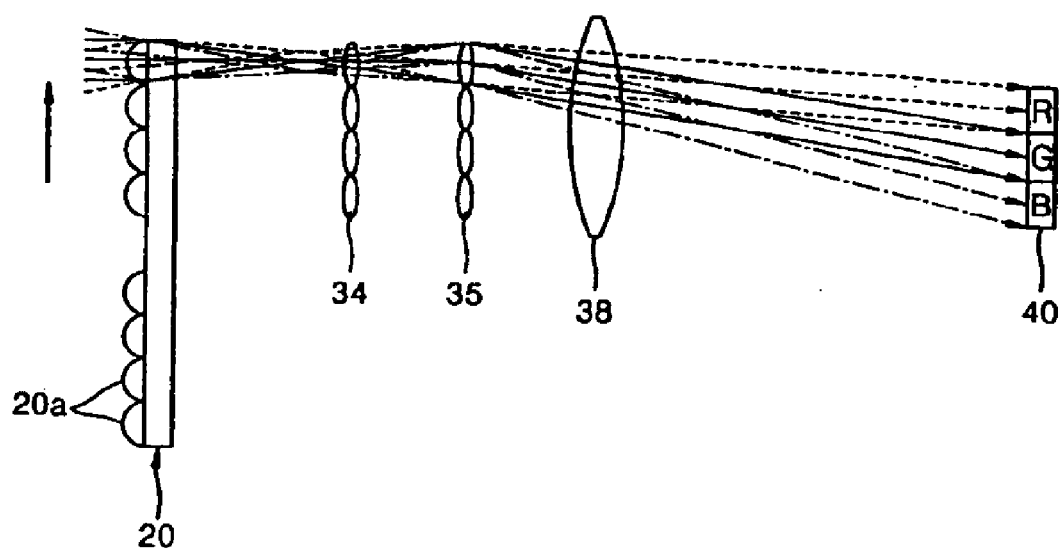
FIGS. 7A through 7C show the scrolling operation of the projection system of FIG. 4.
Figure 7B:
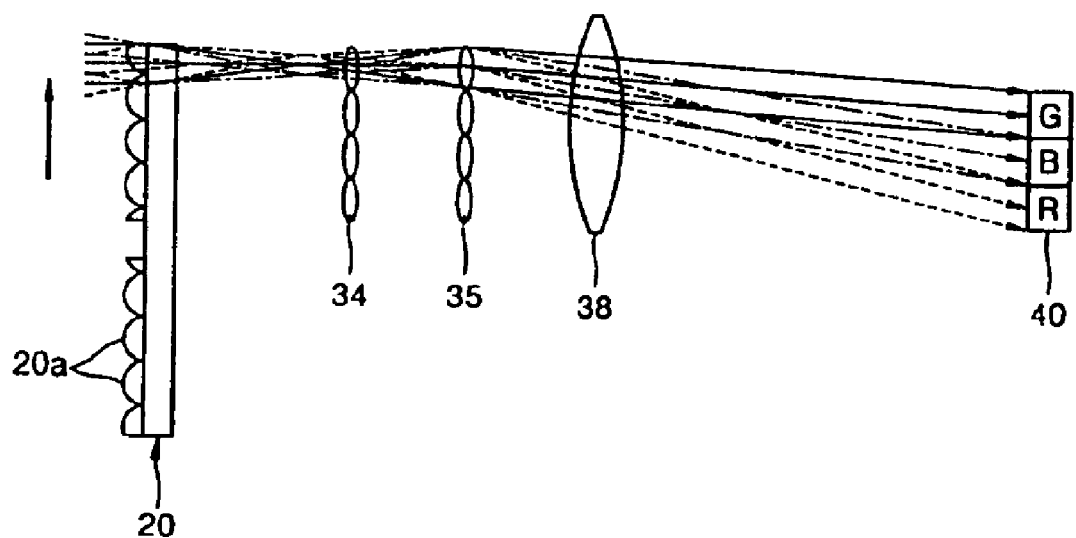
Figure 7C:
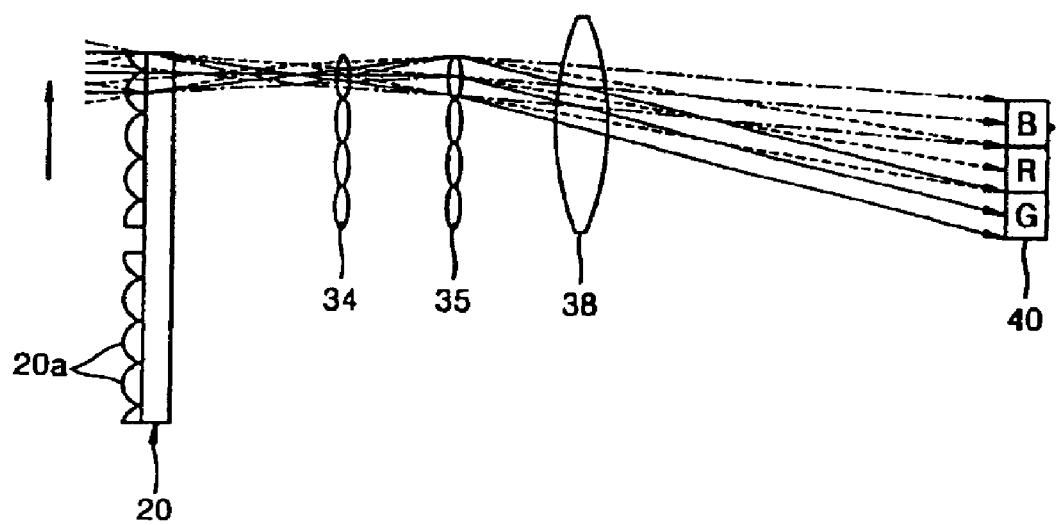

Referring to FIGS. 7A through 7C, the R, G, and B color bars formed on the light valve 40 are scrolled due to the rotation of the scrolling unit 20 from a sequence of R, G, and B, to a sequence of G, B, and R, and then to a sequence of B, R, and G. This scrolling is repeated. The scrolling unit 20 of FIGS. 7A through 7C is a single spiral lens disk.

First, as illustrated in FIG. 7A, the R, G, and B beams pass through the scrolling unit 20, the first and second fly-eye lens arrays 34 and 35, and the relay lens 38, and color bars are formed on the light valve 40 in a predetermined order, for example, in an order of R, G, and B. Next, the scrolling unit 20 rotates, and accordingly, the lens cell array of the scrolling unit 20 through which the incident light L passes gradually moves upward. Accordingly, the focal points of the color beams passing through the scrolling unit 20 vary as the scrolling unit 20 moves, and color bars in an order of G, B, and R are formed, as illustrated in FIG. 7B. Then, the scrolling unit 20 rotates, the incident color beams are scrolled, and color bars in an order of B, R, and G are formed as illustrated in FIG. 7C. Such scrolling is repeated periodically.

Referring to FIG. 5A, when the scrolling unit 20 rotates in the direction indicated by arrow J, the incident light L appears to rectilinearly move in the direction indicated by arrow Q. In other words, as the scrolling unit 20 rotates, the area of the scrolling unit 20 through which the incident light L passes changes. The lens cells 2a through which the incident light L passes appear to move rectilinearly inward, toward the rotating axis of the scrolling unit 20, or outward as the scrolling unit 20 is rotated either counter-clockwise or clockwise, respectively. However, if the scrolling unit 20 has a drum shape, the area of the scrolling unit 20 through which the incident light L passes appears to rectilinearly move along the rotating axis of the scrolling unit 20.

In other words, the positions of lens cells 20a on which light is incident change with the rotation of the scrolling unit 20, and the rotation of the scrolling unit 20 simulates a rectilinear motion of the lens array of the scrolling unit 20 as viewed from the cross-section of the scrolling unit 20 so that scrolling is achieved.

As described above, in a projection system according to the present invention, all color beams can be processed using the single scrolling unit 20 rather than different scrolling units. Hence, the projection system can be made compact, and different color beams can be easily synchronized with one another. Color lines are formed on each of the lens cells 20a of the scrolling unit 20, and likewise, color lines are formed on each of the lens cells 34a of the first fly-eye lens array 34. Accordingly, it is preferable, but not necessary, that lens cells 20a of the scrolling unit 20 through which light passes can correspond one-to-one with row arrays of the first and second fly-eye lens arrays 34 and 35. In other words, if the number of lens cells 20a occupied by light passing through the scrolling unit 20 is 4, each of the first and second fly-eye lens arrays 34 and 35 would have 4 rows of lens cells.

The color bars formed on the light valve 40 are scrolled as described above, thereby forming a color image.

If a liquid crystal display (LCD) or a liquid crystal on silicon (LCOS) display is used as the light valve 40, a rising time and a falling time are required to turn on and off a group of image signals which change every time the R, G, and B color bars are scrolled. To provide for these rising and falling periods of time, black bars are formed between adjacent color bars. Formation of black bars on the light valve 40 will now be described with reference to FIG. 8, which schematically illustrates the spatial filter 5, the color separator 55, and the light valve 40.

Referring to FIG. 8, for convenience of explanation, the intervals between the first and second dichroic filters 55a and 55b and between the second and third dichroic filters 55b and 55c are somewhat exaggerated as a and b, respectively. Color beams produced by the color separator 55 are incident on corresponding color areas of the light valve 40, thereby forming the first, second, and third color bars M1, M2, and M3.

A case where the widths of the first, second, and third color bars M1, M2, and M3 are indicated by $g_1$, $g_2$, and $g_3$, respectively, and are equal to one another will now be described.

The width of each color bar, g ($g=g_1=g_2=g_3$), depend on the width (w) of the slit 5c. The intervals $d_1$ and $d_2$ between the first and second color bars M1 and M2 and between the second and third color bars M2 and M3 depend on the intervals a and b, respectively. The interval between adjacent color bars is determined by the interval between the central lines of the adjacent color bars. The intervals $d_1$ and $d_2$ satisfy Equation 1:

$$d_1 = \alpha a \sqrt{2}$$
$$d_2 = \alpha b \sqrt{2} \quad (1)$$

where $\alpha$ denotes a proportional constant. For example, $\alpha$ can be a magnification. When the slit width of the spatial filter is w, the focal distance of the collimating lens 54 is $f_1$, and the focal distance of the scrolling unit 20 is $f_2$, the width g of each color bar is calculated by Equation 2:

$$g = w \frac{f_2}{f_1} \quad (2)$$

To form black bars K between the first and second color bars M1 and M2 and between the second and third color bars M2 and M3, the interval between adjacent color bars should be greater than the mean of the widths of the adjacent color bars. In other words, the width g of each color bar should be smaller than each of the interval $d_1$ between the first and second color bars M1 and M2 and the interval $d_2$ between the second and third color bars M2 and M3. The conditions for forming the black bars K can be expressed in conditional expression 3:

$$a > \frac{g}{\alpha \sqrt{2}} = \frac{wf_2}{\alpha \sqrt{2} f_1} \quad (3)$$
$$b > \frac{g}{\alpha \sqrt{2}} = \frac{wf_2}{\alpha \sqrt{2} f_1}$$

When the conditions represented in conditional expression 3 are satisfied, the black bars K are formed between the first and second color bars M1 and M2 and between the second and third color bars M2 and M3, so that the rising time and the falling time required to turn on and off image signals to be changed every time the locations of the color bars change can be secured.

Figure 9:
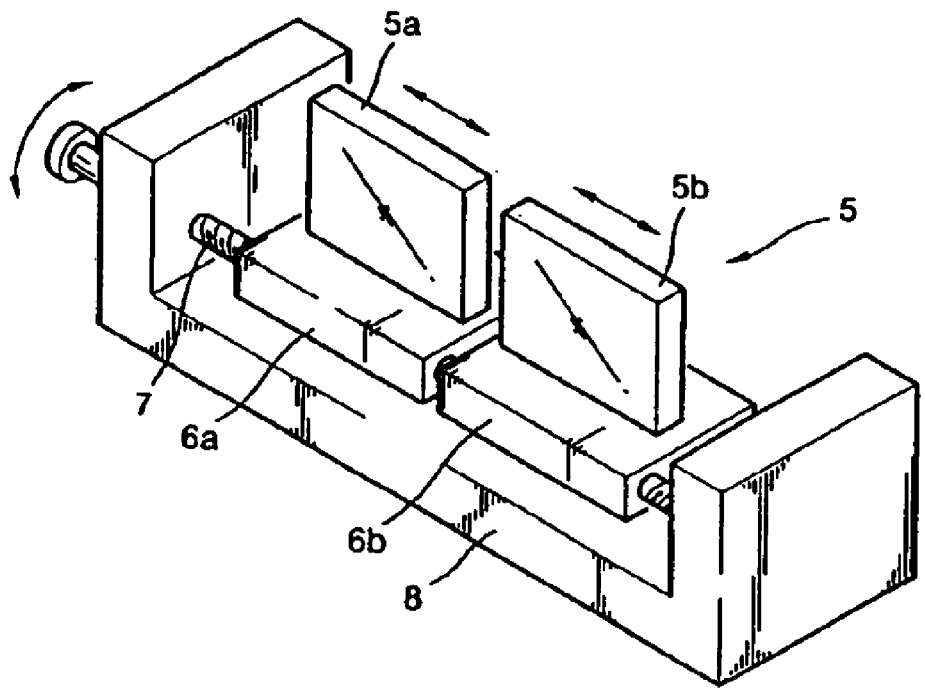
FIG. 9 is a perspective view of a spatial filter in the projection system of FIG. 4.

The spatial filter 5 is designed such that the width w of the slit 5c of FIGS. 10A through 11C can be controlled. As shown in FIG. 9, the spatial filter 5 includes: a first filter plane 5a, a second filter plane 5b, disposed apart from the first filter plane 5a; first and second support plates 6a and 6b, which support the first and second filter planes 5a and 5b, respectively, and are movable by a transfer screw 7; and a frame 8, rotatably supported by the transfer screw 7. When the transfer screw 7 is rotated, the first and second support plates 6a and 6b move along the transfer screw 7 and control the width w of the slit 5c between the first and second filter planes 5a and 5b. Preferably, but not necessarily, the width of the slit 5c is controlled in a color separation direction or in a color scrolling direction.

Figure 10A:
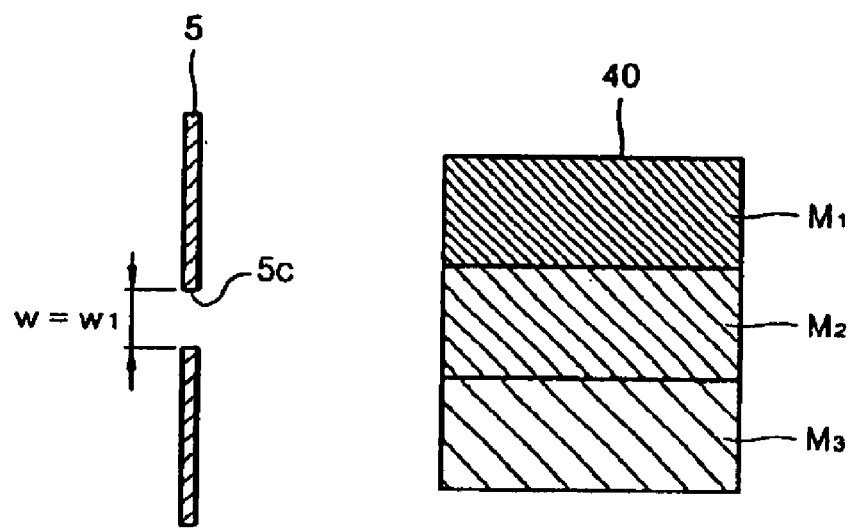
FIGS. 10A through 10C illustrate examples where the widths of color bars formed on a light valve are controlled depending on the width of the slit of the spatial filter in the projection system of FIG. 4.
Figure 10B:
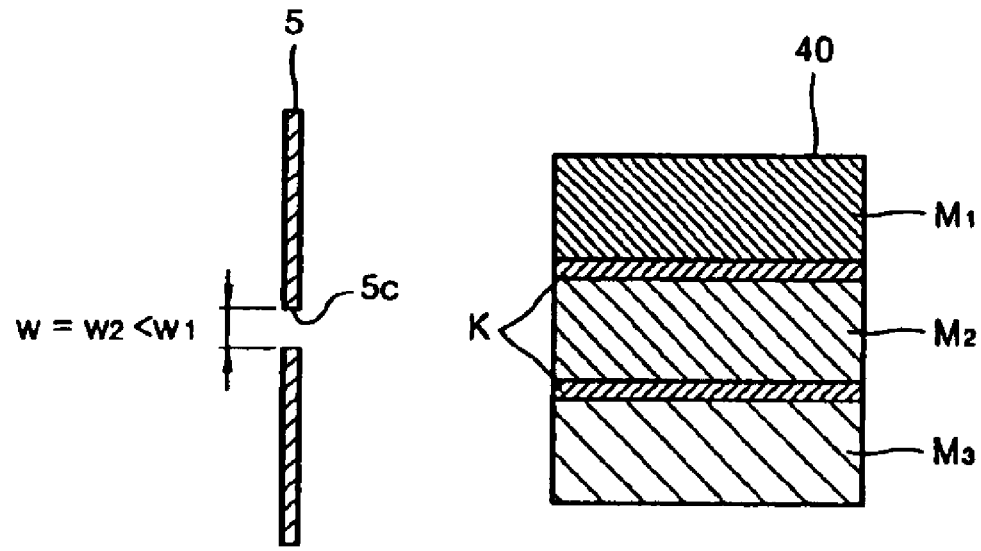
Figure 10C:
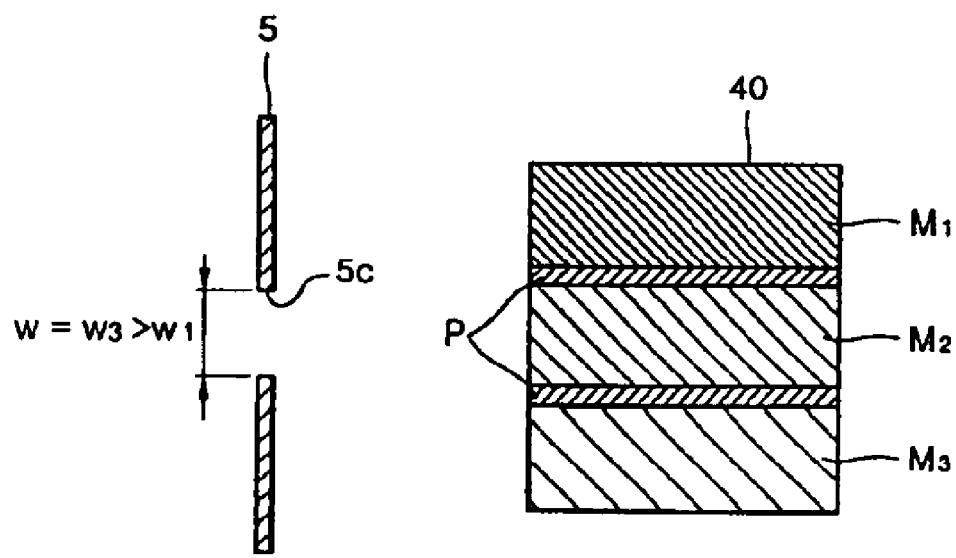

As shown in FIG. 10A, when the width w of the slit 5c is $w_1$, the first, second, and third color bars M1, M2, and M3 are formed in corresponding color areas of the light valve 40 which have equal sizes. If the slit width w changes from $w_1$ to $w_2$ (where $w_2 < w_1$), black bars K are formed between adjacent color bars as illustrated in FIG. 10B. If the slit width w changes from $w_1$ to $w_3$ (where $w_3 > w_1$), the R, G, and B bars are enlarged such that overlapping portions P are formed between adjacent color bars as illustrated in FIG. 10C.

As described above, the black bar K between adjacent color bars can be controlled by satisfying the conditions represented in Equation 3 by adjusting the slit width w or the intervals a and b.

The case where the widths $g_1$, $g_2$, and $g_3$ of the first, second, and third color bars M1, M2, and M3 are different from one another will now be described with reference to FIGS. 11A through 11C.

Figure 11A:
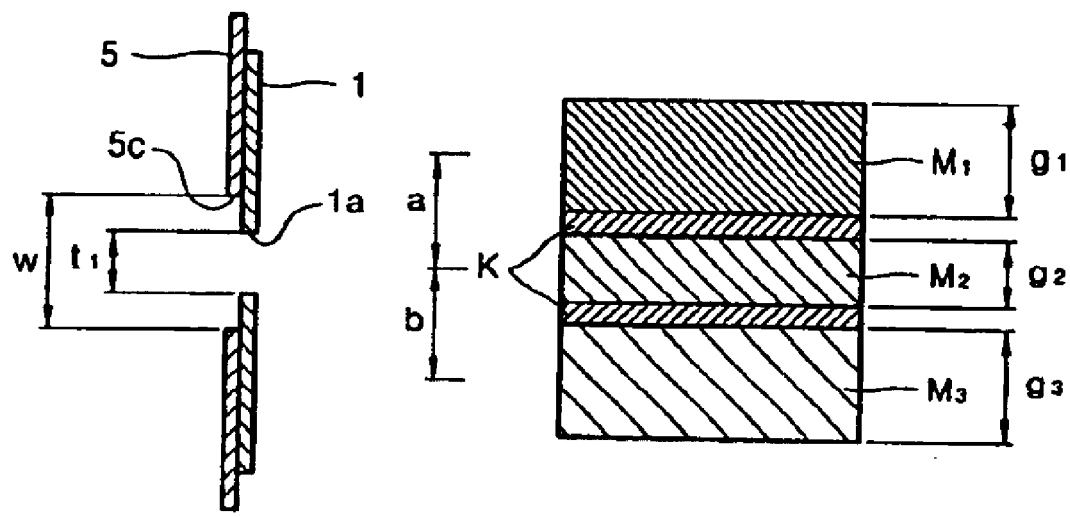
FIGS. 11A through 11C illustrate examples where the widths of color bars formed on a light valve are controlled depending on the widths of the slits in the various filters.
Figure 11B:
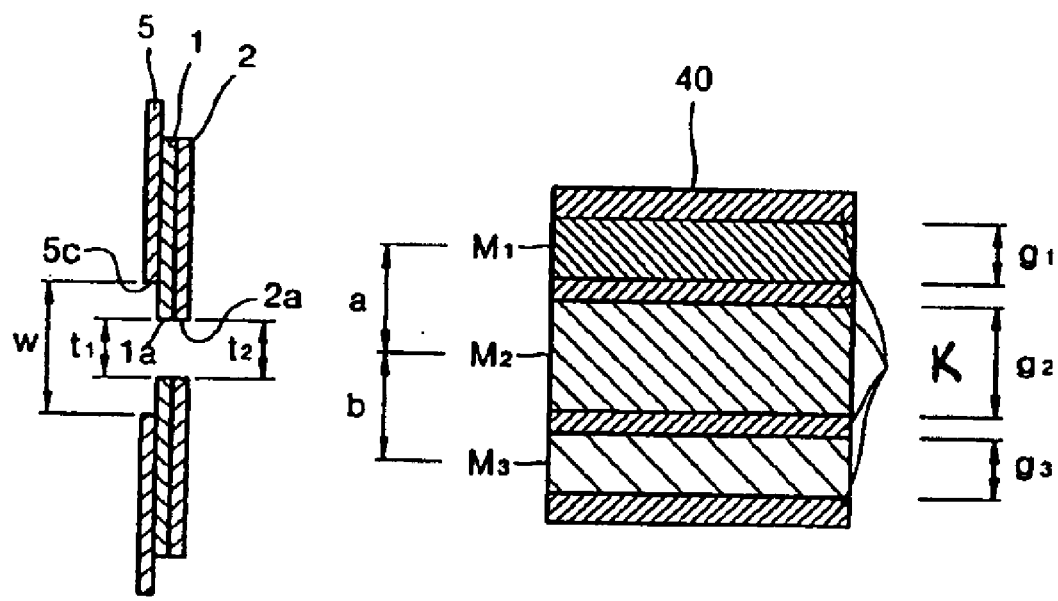
Figure 11C:
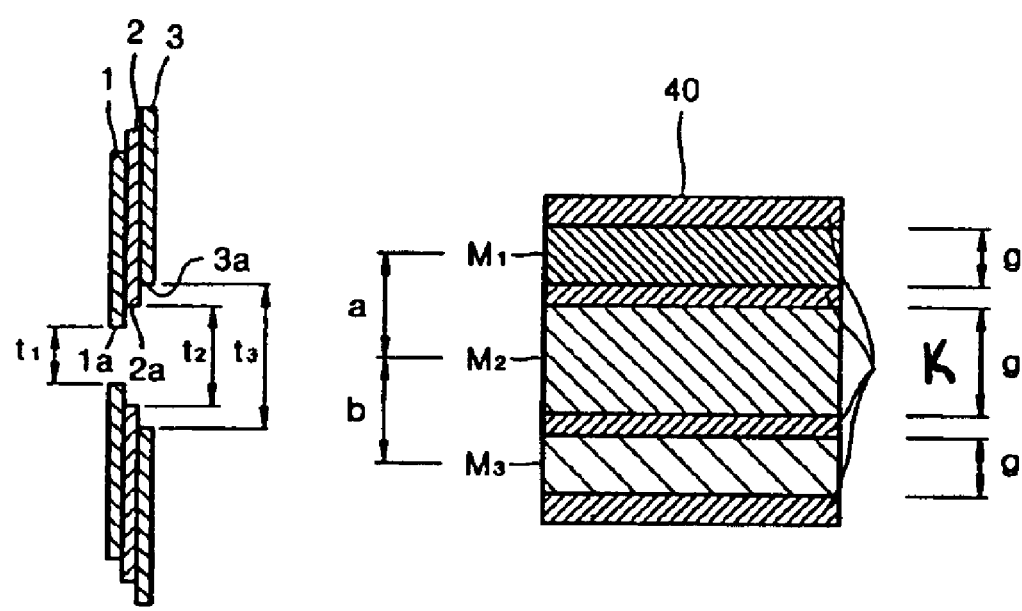

As shown in FIGS. 11A through 11C, at least one of first, second, and third trim filters 1, 2, and 3, which have slits 1a, 2a, and 3a, respectively, may be further included to control the widths or areas of the color bars. The first, second, and third slits 1a, 2a, and 3a of the first, second, and third trim filters 1, 2, and 3 transmit beams of all colors, and the first, second, and third filters 1, 2, and 3 reflect a beam of a specific color and transmits beams of all other colors so that the width of the specific color beam can be controlled.

FIG. 11A shows a case where the first trim filter 1 is attached to the spatial filter 5. The first trim filter 1 reflects a green (G) beam, for example, and transmits the other color beams. The first slit 1a transmits the beams of all colors. The first trim filter 1 is installed behind the spatial filter 5. However, alternately, the first trim filter 1 may be installed in front of the spatial filter 5. First, the widths of color bars are determined to be the same by the width w of the slit 5c of the spatial filter 5. Then, the width of a specific color bar is determined by the width $t_1$ of the first slit 1a of the first trim filter 1. In FIG. 11A, the width $g_2$ of the second color bar M2, for example, a G color bar, is controlled by the first trim filter $t_1$.

FIG. 11B shows a case where the first and second trim filters 1 and 2 are attached to the spatial filter 5. FIG. 11C shows a case where the first, second, and third trim filters 1, 2, and 3 are included instead of the spatial filter 5. The first, second, and third trim filters 1, 2, and 3 may be manufactured by coating the spatial filter 5 or a separate glass with filters. Alternatively, the first, second, and third trim filters 1, 2, and 3 may be filter plates.

The widths of the first, second, and third slits 1a, 2a, and 3a and the width of the slit 5c are controlled in a direction of color separation by the color separator 55 or a color scrolling direction.

Referring back to FIG. 8, the ratio of the interval a between the first and second dichroic filters 55a and 55b to the interval b between the second and third dichroic filters 55b and 55c is the same as that of a sum of the first and second widths $g_1$ and $g_2$ to a sum of the second and third widths $g_2$ and $g_3$. To form a black bar K between the first and second color bars M1 and M2, the half of the sum of the first and second widths $g_1$ and $g_2$ should be smaller than the interval $d_1$ between the first and second color bars M1 and M2. To form a black bar K between the second and third color bars M2 and M3, the half of the sum of the second and third widths $g_2$ and $g_3$ should be smaller than the interval $d_2$ between the second and third color bars M2 and M3. In other words, when the interval between adjacent color bars is greater than the mean of the widths between the adjacent color bars, a black bar K is formed between the adjacent color bars. The above-described conditions to form a black bar K are represented as in Equation 4, by referring to Equation 1:

$$a > \frac{(g_1 + g_2)}{a2\sqrt{2}} \qquad (4)$$

$$b > \frac{(g_2 + g_3)}{a2\sqrt{2}}$$

The widths $g_1$, $g_2$, and $g_3$ of the first, second, and third color bars M1, M2, and M3 can be controlled by the width of the slit 5c and the widths $t_1$, $t_2$, and $t_3$ of the first, second, and third trim filters 1, 2, and 3.

Referring to FIG. 11A, the widths $g_1$, $g_2$, and $g_3$ of the first, second, and third color bars M1, M2, and M3 are first determined depending on the width w of the slit 5c. Thereafter, the width of a beam of a specific color bar is determined depending on the width $t_1$ of the first trim filter 1. Preferably, but not necessarily, the structure of FIG. 11A satisfies the relation of w>$t_1$. If the width $g_2$ of the second color bar M2 is adjusted by the width $t_1$ of the first trim filter 1, the widths $g_1$ and $g_3$ of the first and third color bars are determined depending on the width w of the slit 5c, and the width $g_2$ of the second color bar is determined depending on the width $t_1$ of the first trim filter 1 as represented in Equation 5:

$$g_1 = g_3 = w\frac{f_2}{f_1} \qquad (5)$$

$$g_2 = t_1\frac{f_2}{f_1}$$

A black bar K can be formed between adjacent color bars by controlling at least one of the intervals a and b, the width w of the slit 5c, the width $t_1$ of the first trim filter 1, the focal distance $f_1$ of the collimating lens 54, and the focal distance $f_2$ of the scrolling unit 20 with reference to Equations 4 and 5.

Referring to FIG. 11B, the widths $g_1$, $g_2$, and $g_3$ of the first, second, and third color bars M1, M2, and M3 are first determined depending on the width w of the slit 5c. Thereafter, the width $g_1$ of the first color bar M1 is determined depending on the width $t_1$ of the first trim filter 1, and the width $g_3$ of the third color bar M3 is determined depending on the width $t_2$ of the second trim filter 2. Consequently, the first, second, and third widths $g_1$, $g_2$, and $g_3$ of the first, second, and third color bars M1, M2, and M3 are determined by Equation 6:

$$g_1 = t_1\frac{f_2}{f_1} \qquad (6)$$

$$g_2 = w\frac{f_2}{f_1}$$

$$g_3 = t_2\frac{f_2}{f_1}$$

Preferably, but not necessarily, the widths $t_1$ and $t_2$ of the first and second trim filters 1 and 2 are smaller than the width w of the slit 5c. A black bar K can be formed between adjacent color bars by controlling at least one of the intervals a and b, the width w of the slit 5c, the widths $t_1$ and $t_2$ of the first and second trim filters 1 and 2, the focal distance $f_1$ of the collimating lens 54, and the focal distance $f_2$ of the scrolling unit 20 so that the conditions represented in Equation 4 are satisfied.

Referring to FIG. 11C, the width $g_1$ of the first color bar M1 is determined depending on the width $t_1$ of the first trim filter 1, the width $g_2$ of the second color bar M2 is determined depending on the width $t_2$ of the second trim filter 2, and the width $g_3$ of the third color bar M3 is determined depending on the width $t_3$ of the third trim filter 3. These relations are expressed in Equation 7:

$$g_1 = t_1\frac{f_2}{f_1} \qquad (7)$$

$$g_2 = t_2\frac{f_2}{f_1}$$

$$g_3 = t_3\frac{f_2}{f_1}$$

Black bars can also be formed by controlling the first, second, and third widths $g_1$, $g_2$, and $g_3$ of the first, second, and third color bars M1, M2, and M3 with reference to Equation 7 or by controlling the intervals a and b so that the conditions represented in Equation 4 are satisfied.

As described above, the widths of color bars can be selectively controlled by using the spatial filter 5 with at least one trim filter or by using three trim filters without the spatial filter 5. Furthermore, the widths of black bars can be controlled by controlling the intervals a and b between the first and second dichroic filters 55a and 55b and between the second and third dichroic filters 55b and 55c.

A projection system according to the present invention includes at least one filter having a slit for controlling the widths of the first, second, and third color bars M1, M2, and M3. For example, the at least one filter may include only the spatial filter 5, include both the spatial filter 5 and at least one trim filter, or include the first, second, and third trim filters 1, 2, and 3 without the spatial filter 5. When the slit widths of the spatial filter 5 and the first, second, and third trim filters 1, 2, and 3 are w, $t_1$, $t_2$, and $t_3$, respectively, they can be controlled so that Equation 3 or 4 is satisfied.

As described above, in a projection system according to the present invention, beams of all colors can be scrolled using a single scrolling unit designed so that its rotation simulates the rectilinear motion of a lens array of the scrolling unit through which light passes. Thus, scrolling is easily controlled, and the number of components of the projection system is reduced. Consequently, a small, cost-efficient projection system can be obtained. The scrolling unit may have a drum shape instead of a disk shape as long as its rotation simulates a rectilinear motion of a lens array of the scrolling unit through which light passes.

Also, since a conventional single-panel projection system produces color images by sequentially separating white light into R, G, and B light beams, the efficiency thereof is degraded to ⅓ of the light efficiency of a three-panel projection system. However, in a single-panel projection system using a scrolling technique according to the present invention, white light is separated into R, G, and B beams at one time, and the R, G, and B beams are scrolled to form a color image. Therefore, the single-panel projection system according to the present invention can obtain the same light efficiency as the light efficiency of a three-panel projection system.

Further, in a color image forming method according to the present invention, a black bar is formed between adjacent color bars formed on a light valve so that a rising time and a falling time required to change image signals for the color bars can be secured. Hence, a color image can be smoothly formed.

While the present invention has been particularly shown and described with reference to exemplary embodiments thereof, it would be understood by those of ordinary skill in the art that various changes in form and details may be made therein without departing from the spirit and scope of the present invention.

What is claimed is:

1. A projection system comprising:
   a light source;
   at least one filter having a slit which controls a divergence angle of light emitted from the light source;
   a scrolling unit which scrolls an incident beam;
   a color separator, which separates an incident beam emitted from the light source according to color, the color separator comprising a plurality of dichroic filters, each filter reflecting light of one color and transmitting light of all other colors; and
   a light valve which receives a plurality of color beams, separated by the color separator and transmitted by the scrolling unit, on corresponding color areas and forms a plurality of color bars by the scrolling of the color bars due to a rotation of the scrolling unit;
   wherein a black bar is formed between adjacent color bars by controlling a distance between adjacent dichroic filters or controlling a width of the slit in the at least one filter.

2. The projection system of claim 1, wherein the scrolling unit comprises at least one lens cell and converts a rotation of the scrolling unit into a rectilinear motion of an area of the lens cells through which light passes so that the incident beam is scrolled.

3. The projection system of claim 1, wherein the distance between adjacent color bars is greater than a mean of the widths of the adjacent color bars.

4. The projection system of claim 1, wherein:
   the plurality of dichroic filters comprise first, second, and third dichroic filters disposed parallel to one another, and satisfy the following expression:

$$a > \frac{(g_1 + g_2)}{\alpha 2\sqrt{2}}$$

$$b > \frac{(g_2 + g_3)}{\alpha 2\sqrt{2}}$$

wherein:
   g1, g2, and g3 are the widths of first, second, and third color bars, respectively;
   a is the distance between the first and second dichroic filters;
   b is the distance between the second and third dichroic filters; and
   $\alpha$ is a proportional constant.

5. The projection system of claim 2, wherein the at least one lens cell of the scrolling unit is spirally disposed.

6. The projection system of claim 1, wherein when the at least one filter comprises a spatial filter having a slit and the projection system is disposed to satisfy:

$$a > \frac{g}{\alpha\sqrt{2}} = \frac{wf_2}{\alpha\sqrt{2}\, f_1}$$

$$b > \frac{g}{\alpha\sqrt{2}} = \frac{wf_2}{\alpha\sqrt{2}\, f_1}$$

wherein
a is the distance between the first and second dichroic filters;
b is the distance between the second and third dichroic filters;
g is the width of each color bar;
w is the width of the slit in the spatial filter;
$f_1$ is the focal distance of the spatial filter;
$f_2$ is the focal distance of the scrolling unit; and
$\alpha$ is a proportional constant.

7. The projection system of claim 6, wherein when the at least one filter further comprises a trim filter with a slit width $t_1$, and a focal distance equal to that of the spatial filter; wherein the widths of the first and second color bars, $g_1$ and $g_2$, respectively, are controlled by the spatial filter and the width of the third color bar, $g_3$, is controlled by the trim filter according to the following equation:

$$g_1 = g_3 = w\frac{f_2}{f_1}$$

$$g_2 = t_1 \frac{f_2}{f_1}.$$

8. The projection system of claim 6, wherein when the at least one filter further comprises first and second trim filters with slit widths $t_1$ and $t_2$, respectively, and focal distances equal to that of the spatial filter, wherein the width of the first color bar is controlled by the spatial filter and the widths of the second and third color bars are controlled by the first and second trim filters, respectively, according to the following equation:

$$g_1 = w\frac{f_2}{f_1}$$
$$g_2 = t_1\frac{f_2}{f_1}$$
$$g_3 = t_2\frac{f_2}{f_1}.$$

9. The projection system of claim 1, wherein when the at least one filter comprises first, second, and third trim filters and the projection system is disposed to satisfy the following equation:

$$g_1 = t_1\frac{f_2}{f_1}$$
$$g_2 = t_2\frac{f_2}{f_1}$$
$$g_3 = t_3\frac{f_2}{f_1}$$

wherein:
g1, g2, and g3 are the widths of the first, second, and third color bars, respectively;
t1, t2, and t3 are the widths of the slits in the first, second, and third trim filters, respectively;
f1 is the focal distance of each of the first, second, and third trim filters; and
f2 is the focal distance of the scrolling unit.

10. The projection system of claim 1, further comprising first and second fly-eye lens arrays disposed on a light path between the color separator and the light valve.

11. The projection system of claim 1, further comprising:
a first cylindrical lens, disposed in front of the scrolling unit, which reduces the width of light incident on the scrolling unit; and
a second cylindrical lens, disposed behind the scrolling unit, which returns the light transmitted by the scrolling unit to its original width.

12. The projection system of claim 11, further comprising first and second fly-eye lens arrays disposed on a light path between the color separator and the light valve.

13. The projection system of claim 12, further comprising a relay lens disposed on a light path between the second fly-eye lens and the light valve.

14. The projection system of claim 1, further comprising a polarization conversion system, disposed on a light path between the color separator and the light valve, which converts light emitted from the light source into light with a single polarization.

15. The projection system of claim 1, wherein the light valve comprises one of a liquid crystal display (LCD) and a liquid crystal on silicon (LCOS).

16. A method of forming a color image, in which a rising time and a falling time are required to change image signals for a plurality of color bars formed on a light valve, comprising:
providing a projection system comprising:
at least one filter having a slit
scrolling incident light from a light source;
separating light emitted from the light source according to color using a color separator which comprises a plurality of dichroic filters, each reflecting light of one color and transmitting light of all other colors;
forming a plurality of color bars by making a plurality of color beams, separated by the color separator and transmitted by the scrolling unit, incident on corresponding color areas of the light valve; and
forming a black bar between adjacent color bars by controlling a distance between adjacent dichroic filters or by controlling a width of the slit in the at least one filter.

17. The method of claim 16, wherein scrolling incident light is accomplished by converting a rotation of a scrolling unit into a rectilinear motion of a lens cell of the scrolling unit through which the incident light passes.

18. The method of claim 16, wherein the distance between adjacent color bars is greater than a mean of the widths of the adjacent color bars.

19. The method of claim 16, wherein the plurality of dichroic filters comprise first, second, and third dichroic filters, disposed parallel to one another, satisfying the following expression:

$$a > \frac{(g_1 + g_2)}{\alpha 2\sqrt{2}}$$
$$b > \frac{(g_2 + g_3)}{\alpha 2\sqrt{2}}$$

wherein:
g1, g2, and g3 are the widths of first, second, and third color bars, respectively;
a is the distance between the first and second dichroic filters;
b is the distance between the second and third dichroic filters; and
α is a proportional constant.

20. The method of claim 17, wherein the at least one lens cell of the scrolling unit is spirally disposed.

21. The method of claim 16, wherein when the at least one filter comprises a spatial filter having a slit, further comprising disposing the projection system according to the following expression:

$$a > \frac{g}{\alpha\sqrt{2}} = \frac{wf_2}{\alpha\sqrt{2} f_1}$$
$$b > \frac{g}{\alpha\sqrt{2}} = \frac{wf_2}{\alpha\sqrt{2} f_1}$$

wherein:
a is the distance between the first and second dichroic filters;
b is the distance between the second and third dichroic filters;
g is the width of each color bar;
w is the width of the slit in the spatial filter;
$f_1$ is the focal distance of the spatial filter;
$f_2$ is the focal distance of the scrolling unit; and
α is a proportional constant.

22. The method of claim 21, wherein when the at least one filter further comprises a trim filter with a slit width $t_1$, and a focal distance equal to that of the spatial filter, further comprising controlling the widths of the first and second color bars, g1 and g2, respectively, by the spatial filter and controlling the width of the third color bar, g3, by the trim filter, according to the following equation:

$$g_1 = g_3 = w\frac{f_2}{f_1}$$
$$g_2 = t_1\frac{f_2}{f_1}.$$

23. The method of claim 21, wherein when the at least one filter further comprises first and second trim filters with slit widths $t_1$ and $t_2$, respectively, and focal distances equal to that of the spatial filter, further comprising controlling the width of the first color bar by the spatial filter and controlling the widths of the second and third color bars by the first and second trim filters, respectively, according to the following equation:

$$g_1 = w\frac{f_2}{f_1}$$
$$g_2 = t_1\frac{f_2}{f_1}$$
$$g_3 = t_2\frac{f_2}{f_1}.$$

24. The method of claim 16, wherein when the at least one filter comprises first, second, and third trim filters, further comprising disposing the projection system according to the following equation:

$$g_1 = t_1\frac{f_2}{f_1}$$
$$g_2 = t_2\frac{f_2}{f_1}$$

-continued $$g_3 = t_3\frac{f_2}{f_1}$$

wherein:
g1, g2, and g3 are the widths of the first, second, and third color bars, respectively;
t1, t2, and t3 are the widths of the slits in the first, second, and third trim filters, respectively;
f1 is the focal distance of each of the first, second, and third trim filters; and
f2 is the focal distance of the scrolling unit.

25. The method of claim 16, further comprising disposing first and second fly-eye lens arrays on a light path between the color separator and the light valve.

26. The method of claim 16, further comprising reducing the width of light incident upon the scrolling unit with a first cylindrical lens disposed in front of the scrolling unit, and returning the light transmitted by the scrolling unit to its original width with a second cylindrical lens disposed behind the scrolling unit.

27. The method of claim 26, further comprising disposing first and second fly-eye lens arrays on a light path between the color separator and the light valve.

28. The method of claim 27, further comprising disposing a relay lens on a light path between the second fly-eye lens and the light valve.

29. The method of claim 16, further comprising converting light emitted from the light source into light with a single polarization with a polarization conversion system disposed on a light path between the color separator and the light valve.

30. The method of claim 16, wherein the light valve comprises one of a liquid crystal display (LCD) and a liquid crystal on silicon (LCOS).

* * * * *